(12) United States Patent
Kim

(10) Patent No.: US 11,785,178 B2
(45) Date of Patent: *Oct. 10, 2023

(54) METHOD, SYSTEM, AND NON-TRANSITORY COMPUTER READABLE RECORD MEDIUM FOR PROVIDING COMMUNICATION USING VIDEO CALL BOT

(71) Applicant: LINE Plus Corporation, Seongnam-si (KR)

(72) Inventor: Na Young Kim, Seongnam-si (KR)

(73) Assignee: LINE Plus Corporation, Seongnam-si (KR)

(*) Notice: Subject to any disclaimer, the term of this patent is extended or adjusted under 35 U.S.C. 154(b) by 0 days.

This patent is subject to a terminal disclaimer.

(21) Appl. No.: 17/729,262

(22) Filed: Apr. 26, 2022

(65) Prior Publication Data

US 2022/0256115 A1 Aug. 11, 2022

Related U.S. Application Data

(63) Continuation of application No. 17/168,936, filed on Feb. 5, 2021, now Pat. No. 11,343,468.

(30) Foreign Application Priority Data

Feb. 12, 2020 (KR) .................. 10-2020-0017048

(51) Int. Cl.
*H04N 7/14* (2006.01)
*H04L 51/02* (2022.01)
*G06F 3/16* (2006.01)

(52) U.S. Cl.
CPC ............. *H04N 7/148* (2013.01); *G06F 3/167* (2013.01); *H04L 51/02* (2013.01)

(58) Field of Classification Search
CPC .......... H04N 7/148; H04L 51/02; G06F 3/167
See application file for complete search history.

(56) References Cited

U.S. PATENT DOCUMENTS

| 2015/0373183 | A1* | 12/2015 | Woolsey | ........... | H04M 1/72448 |
| | | | | | 455/418 |
| 2016/0335532 | A1 | 11/2016 | Sanghavi et al. | | |
| 2018/0300399 | A1* | 10/2018 | Blandin | ................. | G06N 5/022 |
| 2018/0367483 | A1* | 12/2018 | Rodriguez | ............ | H04L 51/046 |
| 2019/0189117 | A1 | 6/2019 | Kumar | | |

FOREIGN PATENT DOCUMENTS

KR 10-0401262 B1 10/2003

* cited by examiner

*Primary Examiner* — Amal S Zenati
(74) *Attorney, Agent, or Firm* — Sughrue Mion, PLLC

(57) ABSTRACT

A method, a system, and a non-transitory computer-readable record medium for providing a communication using a video call bot are disclosed. A video call method implemented by a computer apparatus, may include: in response to a request for inviting a chat bot to a video call in which a plurality of users comprising a user of the computer apparatus participate, displaying the chat bot on a display screen for the video call; transmitting, to a server, a command line that is associated with the chat bot and is extracted from an a voice input that is input to the computer apparatus during the video call; and in response to the command line, outputting a response to the command line through the chat bot that participates in the video call.

20 Claims, 12 Drawing Sheets

FIG. 8

| Bot(810) | Wake Up Word(820) |
|---|---|
| Bot II(Translation bot) | Brown |
| Bot III(Reaction bot) | Cony |
| Bot X(Map bot) | Sally |
| ... | ... |

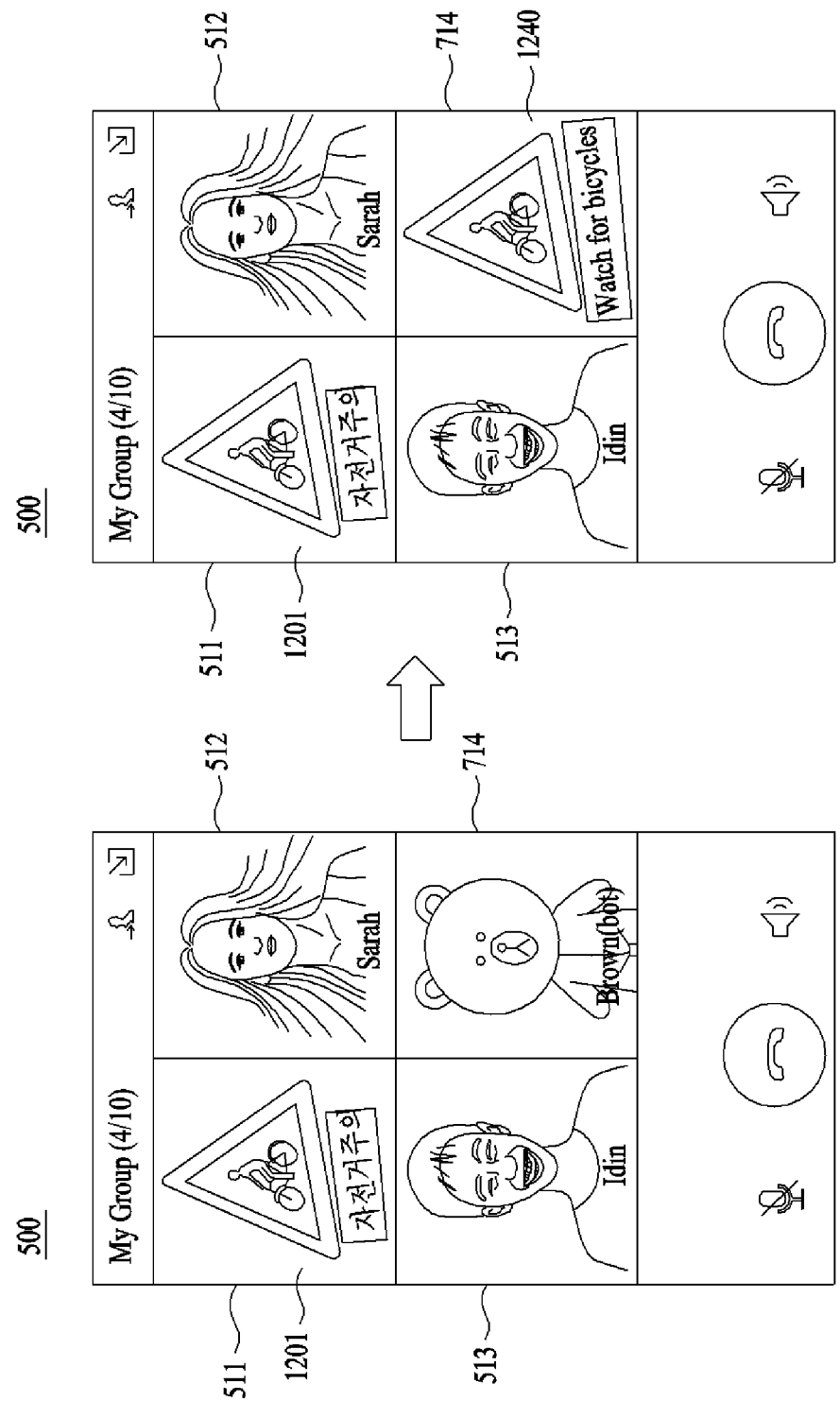

METHOD, SYSTEM, AND NON-TRANSITORY COMPUTER READABLE RECORD MEDIUM FOR PROVIDING COMMUNICATION USING VIDEO CALL BOT

CROSS-REFERENCE TO RELATED APPLICATION

This application is a continuation application of U.S. application Ser. No. 17/168,936, filed Feb. 5, 2021, which claims priority from Korean Patent Application No. 10-2020-0017048, filed Feb. 12, 2020 in the Korean Intellectual Property Office (KIPO), the disclosures of which are incorporated herein by reference in their entireties.

BACKGROUND

1. Field

Apparatuses and methods consistent with example embodiments relate to providing a video call function using a video call bot.

2. Description of Related Art

A current communication device provides various services, such as, for example, a wireless Internet service and a terrestrial/satellite broadcasting service, in addition to a voice call service and a text service.

In particular, with the development in video compression technology and reconstruction technology and with commercialization of a device equipped with a camera, there is provided a video call service that enables a communication with verifying a face of a counterpart.

A related technology provides a video call service between mobile phone terminals in a mobile telephone network of a wireless environment.

SUMMARY

Example embodiments may provide a video call bot that supports a communication in a video call situation.

Example embodiments may invite a bot as a participant of a video call and may display an image associated with a bot on a video call screen that includes a video of the participant.

Example embodiments may provide content corresponding to a voice or a video at a specific point in time as a response through a bot that participates in a video call.

According to an aspect of at least one example embodiment, there is provided a video call method implemented by a computer apparatus, the video call method including: in response to a request for inviting a chat bot to a video call in which a plurality of users comprising a user of the computer apparatus participate, displaying the chat bot on a display screen for the video call; transmitting, to a server, a command line that is associated with the chat bot and is extracted from an a voice input that is input to the computer apparatus during the video call; and in response to the command line, outputting a response to the command line through the chat bot that participates in the video call.

The displaying may include: receiving a first video associated with the chat bot from the server; rendering a second video of at least one user among the plurality of users participating in the video call and the first video associated with the chat bot; and simultaneously displaying the first video and the second video on the display screen.

The displaying may include: recognizing a bot invitation command that is input to the computer apparatus, during the video call; and displaying the chat bot corresponding to the bot invitation command as a participant of the video call in response to the bot invitation command.

The chat bot may be one of a plurality of different types of chat bots, and the video call method may further include setting a wake-up word for each of the plurality of different types of chat bots.

The wake-up word may be used as a bot invitation command for inviting the chat bot before the chat bot participates in the video call, and the wake-up word may be used as a response request command for requesting the chat bot to provide the response after the chat bot participates in the video call.

The transmitting may include: recognizing the command line for the chat bot that is input to the computer apparatus; and transmitting, to the server, a voice or a video that is input to the computer apparatus after the command line is recognized.

The transmitting of the voice or the video may include: transmitting, to the server, the voice or the video that is input within a predetermined period of time since the command line is recognized.

The outputting may include: outputting, as a voice or a video, the response retrieved by the server to the command line through the chat bot that participates in the video call.

The outputting may include: displaying the response to the command line in an area designated for the chat bot on the display screen.

The outputting may include: outputting the response to the command line as a voice corresponding to the chat bot that participates in the video call According to an aspect of at least another example embodiment, there is provided A non-transitory computer-readable record medium storing instructions that, when executed by a processor of the computer apparatus, cause the processor to perform the video call method.

According to an aspect of at least one example embodiment, there is provided a computer apparatus including: at least one memory configured to store computer-readable instructions; and at least one processor configured to execute the computer-readable instructions to: in response to a request for inviting a chat bot to a video call in which a plurality of users comprising a user of the computer apparatus participate, display the chat bot on a display screen for the video call; transmit, to a server, a command line that is associated with the chat bot and is extracted from a voice input that is input to the computer apparatus during the video call; and in response to the command line, output a response to the command line through the chat bot that participates in the video call.

The at least one processor may be further configured to execute the computer-readable instructions to: receive a first video associated with the chat bot from the server; render a second video of at least one user among the plurality of users participating in the video call and the first video associated with the chat bot; and simultaneously display the first video and the second video on the display screen.

The at least one processor may be further configured to execute the computer-readable instructions to: recognize a bot invitation command that is input to the computer apparatus, during the video call; and display the chat bot corresponding to the bot invitation command as a participant of the video call in response to the bot invitation command.

The chat bot may be one of a plurality of different types of chat bots, and the at least one processor may be further configured to execute the computer-readable instructions to: set a wake-up word for each of the plurality of different types of chat bots.

The wake-up word may be used as an invitation command for inviting the chat bot before the chat bot participates in the video call, and the wake-up word may be used as a response request command for requesting the chat bot to provide the response after the chat bot participates in the video call.

The at least one processor may be further configured to execute the computer-readable instructions to: recognize the command line for the chat bot that is input to the computer apparatus; and transmit, to the server, a voice or a video that is input to the computer apparatus after the command line is recognized.

The at least one processor may be further configured to execute the computer-readable instructions to: transmit, to the server, the voice or the video that is input within a predetermined time since the command line is recognized.

The at least one processor may be further configured to execute the computer-readable instructions to: display the response to the command line on an area designated the chat bot on the display screen.

The at least one processor may be further configured to execute the computer-readable instructions to: output the response to the command line as a voice corresponding to the chat bot that participates in the video call.

According to an aspect of at least one example embodiment, there is provided a computer apparatus including: at least one memory configured to store computer-readable instructions; and at least one processor configured to execute the computer-readable instructions to: connect the computer apparatus to a video call; in response to recognizing a bot invitation command, inviting a chat bot to the video call and displaying the chat bot on a video call screen, together with images provided from participants of the video call; and in response to recognizing, from a voice that is input from at least one of the participants of the video call, a response request command that requests the chat bot to provide a response, replace a chat bot image of the chat bot with the response provided from the chat bot, during the video call.

The participants of the video call may include a first participant, and the at least one processor may be further configured to execute the computer-readable instructions to: when the response request command comprises a translation request that is received from an electronic device of the first participant, translate an original text image that is input from the electronic device of the first participant, through the chat bot, and replace the chat bot image with a result of translating the original text image.

The at least one processor may be further configured to execute the computer-readable instructions to: when the response request command comprises a location information request, obtain a map including requested location information, through the chat bot, and replace the chat bot image with the map.

BRIEF DESCRIPTION OF THE DRAWINGS

The above and/or other aspects will be more apparent by describing certain example embodiments, with reference to the accompanying drawings, in which:

FIGS. 5 to 12 illustrate examples of describing a process of providing a communication using a video call bot according to at least one example embodiment.

DETAILED DESCRIPTION

Figure 1:
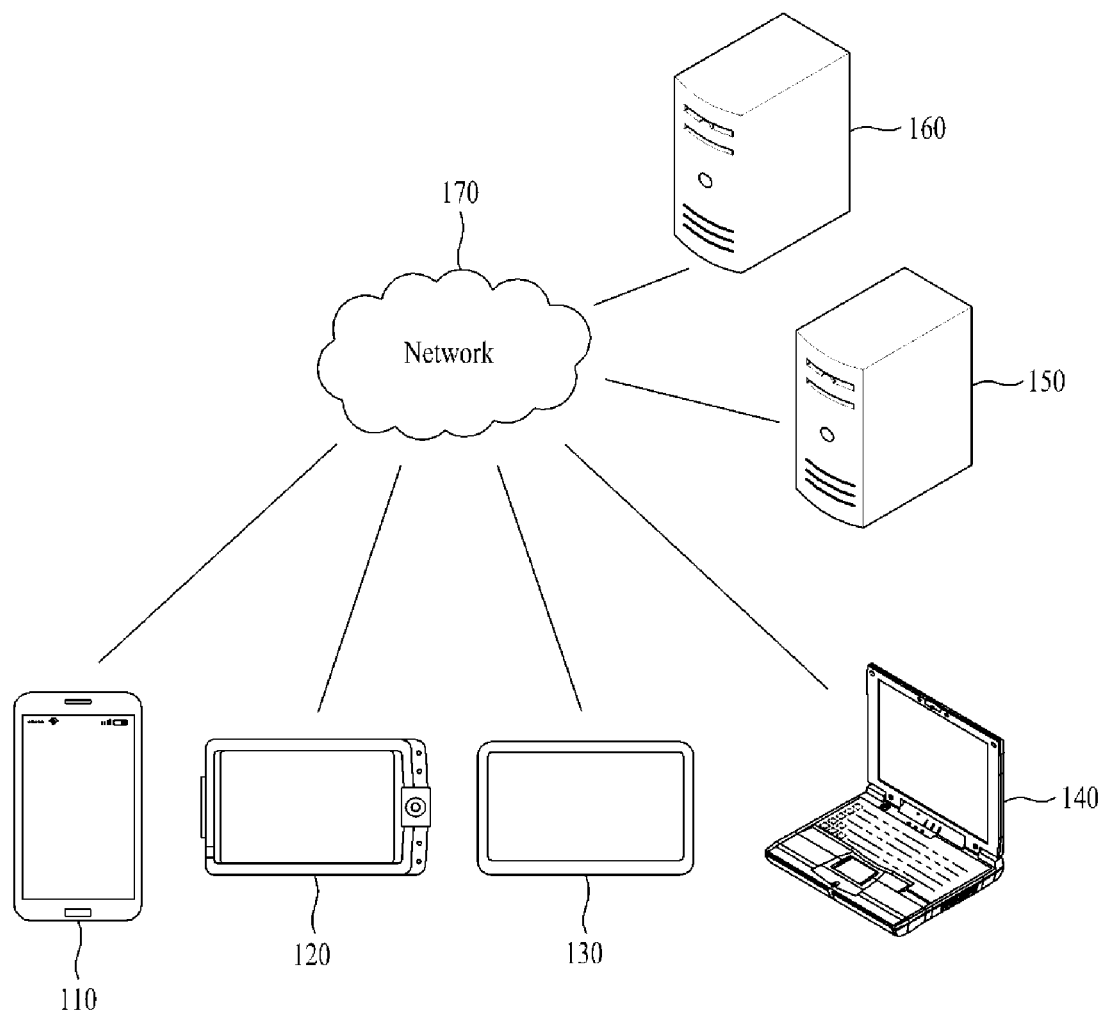
FIG. 1 is a diagram illustrating an example of a network environment according to at least one example embodiment.

Example embodiments are described in greater detail below with reference to the accompanying drawings.

In the following description, like drawing reference numerals are used for like elements, even in different drawings. The matters defined in the description, such as detailed construction and elements, are provided to assist in a comprehensive understanding of the example embodiments. However, it is apparent that the example embodiments can be practiced without those specifically defined matters. Also, well-known functions or constructions are not described in detail since they would obscure the description with unnecessary detail.

One or more example embodiments will be described in detail with reference to the accompanying drawings. Example embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated.

Although the terms "first," "second," "third," etc., may be used herein to describe various elements, components, regions, layers, and/or sections, these elements, components, regions, layers, and/or sections, should not be limited by these terms. These terms are only used to distinguish one element, component, region, layer, or section, from another region, layer, or section. Thus, a first element, component, region, layer, or section, discussed below may be termed a second element, component, region, layer, or section, without departing from the scope of this disclosure.

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

As used herein, the singular forms "a," "an," and "the," are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups, thereof. As used herein, the term "and/or" includes any and all combinations of one or more of the associated listed products. Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, all of a, b, and c, or any variations of the aforementioned examples. Also, the term "exemplary" is intended to refer to an example or illustration.

When an element is referred to as being "on," "connected to," "coupled to," or "adjacent to," another element, the element may be directly on, connected to, coupled to, or adjacent to, the other element, or one or more other intervening elements may be present. In contrast, when an element is referred to as being "directly on," "directly connected to," "directly coupled to," or "immediately adjacent to," another element there are no intervening elements present.

Unless otherwise defined, all terms (including technical and scientific terms) used herein have the same meaning as commonly understood by one of ordinary skill in the art to which example embodiments belong. Terms, such as those defined in commonly used dictionaries, should be interpreted as having a meaning that is consistent with their meaning in the context of the relevant art and/or this disclosure, and should not be interpreted in an idealized or overly formal sense unless expressly so defined herein.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particular manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

Units and/or devices according to one or more example embodiments may be implemented using hardware and/or a combination of hardware and software. For example, hardware devices may be implemented using processing circuitry such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor), Central Processing Unit (CPU), a controller, an arithmetic logic unit (ALU), a digital signal processor, a microcomputer, a microprocessor, etc., the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer record medium or device, capable of providing instructions or data to, or being interpreted by, a hardware device. The software also may be distributed over network coupled computer systems so that the software is stored and executed in a distributed fashion. In particular, for example, software and data may be stored by one or more computer readable record mediums, including the tangible or non-transitory computer-readable storage media discussed herein.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive, solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable record medium into the one or more storage devices and/or one or more computer processing devices using a drive mechanism. Such separate computer readable record medium may include a Universal Serial Bus (USB) flash drive, a memory stick, a Blu-ray/

DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable record medium. Additionally, the computer programs, program code, instructions, or some combination thereof, may be loaded into the one or more storage devices and/or the one or more processors from a remote computing system that is configured to forward and/or distribute the computer programs, program code, instructions, or some combination thereof, over a network. The remote computing system may forward and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as one computer processing device; however, one skilled in the art will appreciate that a hardware device may include multiple processing elements and multiple types of processing elements. For example, a hardware device may include multiple processors or a processor and a controller. In addition, other processing configurations are possible, such as parallel processors.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

Hereinafter, example embodiments will be described with reference to the accompanying drawings.

The example embodiments relate to technology for providing a video call function. The term "video call" may be also referred to as a video chat.

The example embodiments including the disclosures described herein may provide a video call bot that assists a communication in a video call situation. The term "video call bot" may be also referred to as a video chat bot or a video bot.

FIG. 1 illustrates an example of a network environment according to at least one example embodiment. Referring to FIG. 1, the network environment may include a plurality of electronic devices 110, 120, 130, and 140, a plurality of servers 150 and 160, and a network 170. FIG. 1 is provided as an example only. A number of electronic devices or a number of servers is not limited thereto.

Each of the plurality of electronic devices 110, 120, 130, and 140 may be a stationary terminal or a mobile terminal that is configured as a computer apparatus. For example, the plurality of electronic devices 110, 120, 130, and 140 may be a smartphone, a mobile phone, a navigation device, a computer, a laptop computer, a digital broadcasting terminal, a personal digital assistant (PDA), a portable multimedia player (PMP), a tablet PC, a game console, a wearable device, an Internet of things (IoT) device, a virtual reality (VR) device, an augmented reality (AR) device, and the like. For example, although FIG. 1 illustrates a shape of a smartphone as an example of the electronic device 110, the electronic device 110 used herein may refer to one of various types of physical computer apparatuses capable of communicating with other electronic devices 120, 130, and 140, and/or the servers 150 and 160 over the network 170 in a wireless or wired communication manner.

The communication scheme is not limited and may include a near field wireless communication scheme between devices as well as a communication scheme using a communication network (e.g., a mobile communication network, wired Internet, wireless Internet, a broadcasting network, a satellite network, etc.) includable in the network 170. For example, the network 170 may include at least one of network topologies that include a personal area network (PAN), a local area network (LAN), a campus area network (CAN), a metropolitan area network (MAN), a wide area network (WAN), a broadband network (BBN), and Internet. Also, the network 170 may include at least one of network topologies that include a bus network, a star network, a ring network, a mesh network, a star-bus network, a tree or hierarchical network, and the like. However, they are provided as examples only.

Each of the servers 150 and 160 may be configured as a computer apparatus or a plurality of computer apparatuses that provides an instruction, a code, a file, content, a service, etc., through communication with the plurality of electronic devices 110, 120, 130, and 140 over the network 170. For example, the server 150 may be a system that provides a first service to the plurality of electronic devices 110, 120, 130, and 140 connected over the network 170. The server 160 may be a system that provides a second service to the plurality of electronic devices 110, 120, 130, and 140 connected over the network 170. In detail, for example, the server 150 may provide, as the first service, a service (e.g., a video call service) intended by an application through the application as a computer program installed and executed on the plurality of electronic devices 110, 120, 130, and 140. As another example, the server 160 may provide, as the second service, a service that distributes a file for installing and executing the application to the plurality of electronic devices 110, 120, 130, and 140.

Figure 2:
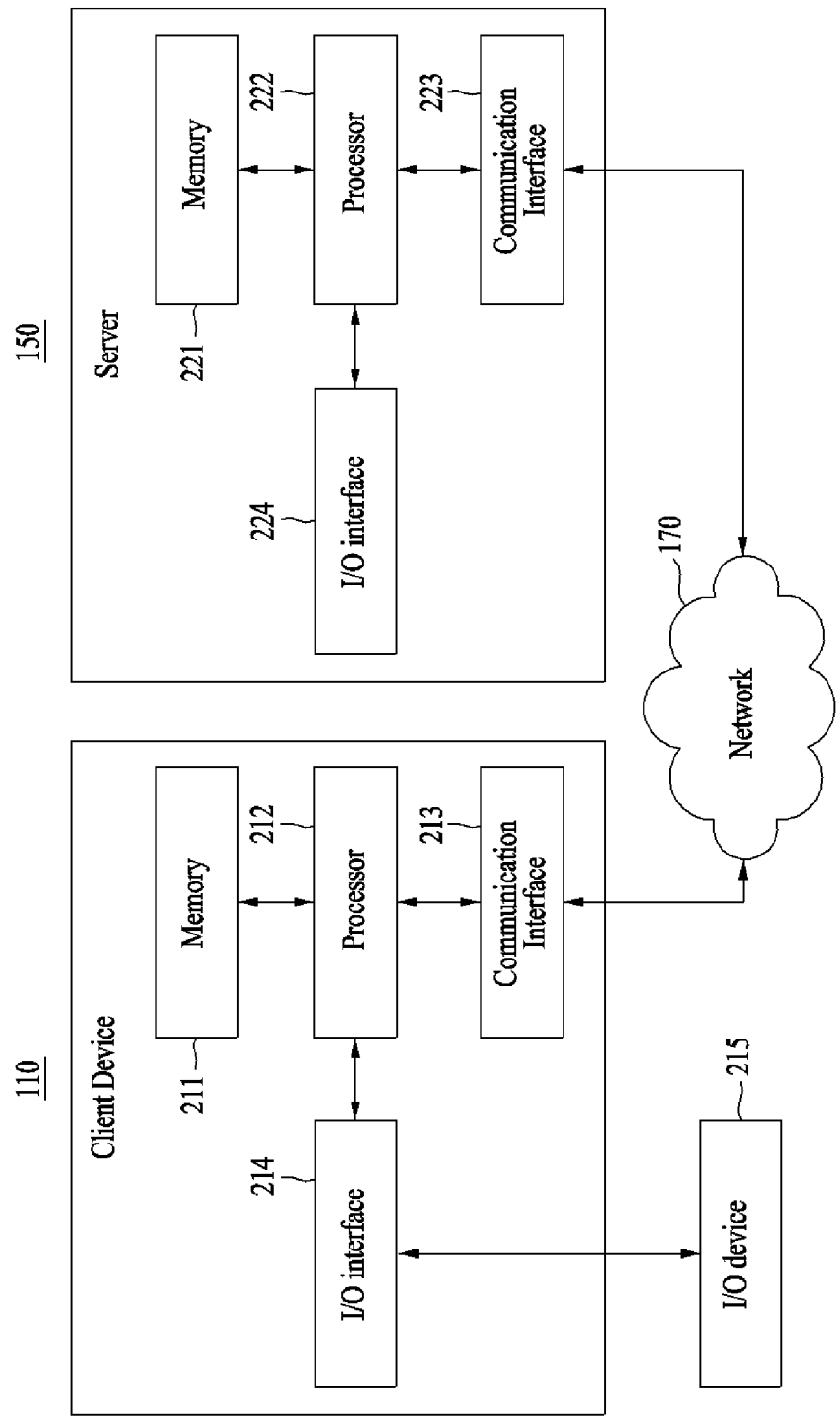
FIG. 2 is a diagram illustrating an example of an electronic device and a server according to at least one example embodiment.

FIG. 2 is a block diagram illustrating an example of a client device 210 and a server 220 according to at least one example embodiment. The client device 210 may correspond to any of the electronic devices 110, 120, 130, and 140 shown in FIG. 1, and the server 220 may correspond to any of the servers 150 and 160 shown in FIG. 1.

Referring to FIG. 2, the client device 210 may include a memory 211, a processor 212, a communication interface 213, and an input/output (I/O) interface 214, and the server 220 may include a memory 221, a processor 222, a communication interface 223, and an I/O interface 224. The memory 211, 221 may include a permanent mass storage device, such as random access memory (RAM), a read only memory (ROM), a disk drive, a solid state drive (SSD), a flash memory, etc., as a non-transitory computer-readable record medium. The permanent mass storage device, such as ROM, SSD, flash memory, and disk drive, may be included in the client device 210 or the server 220 as a permanent storage device separate from the memory 211, 221. Also, an OS and at least one program code, for example, a code for a browser installed and executed on the client device 210 or an application installed and executed on the client device 210 to provide a specific service, may be stored in the memory 211, 221. Such software components may be loaded from another non-transitory computer-readable record medium separate from the memory 211, 221. The other non-transitory computer-readable record medium may include a non-transitory computer-readable record medium, for example, a floppy drive, a disk, a tape, a DVD/CD-ROM drive, a memory card, etc. According to other example embodiments, software components may be loaded to the memory 211, 221 through the communication interface 213, 223, instead of the non-transitory computer-readable record medium. For example, at least one program may be loaded to the memory 211, 221 based on a computer program, for example, the application, installed by files provided over the network 170 from developers or a file distribution system, for example, the server 160, providing an installation file of the application.

The processor 212, 222 may be configured to process instructions of a computer program by performing basic arithmetic operations, logic operations, and I/O operations. The computer-readable instructions may be provided from the memory 211, 221 or the communication interface 213, 223 to the processor 212, 222. For example, the processor 212, 222 may be configured to execute received instructions in response to the program code stored in the storage device, such as the memory 211, 221.

The communication interface 213, 223 may provide a function for communication between the client device 210 and the server 220 over the network 170 and may provide a function for communication between the client device 210 and another client device or another server, and between the server 220 and another client device or server. For example, the processor 212 of the client device 210 may forward a request created based on a program code stored in the storage device such as the memory 211, to the server 220 over the network 170 under control of the communication interface 213. The client device 210 may receive a control signal, an instruction, content, a file, and the like, provided under control of the processor 222 of the server through the communication interface 213 of the client device 210, from the communication interface 223 of the server 220. For example, a control signal, an instruction, content, a file, and the like of the server 220 received through the communication interface 213 may be forwarded to the processor 212 or the memory 211, and content, a file, and the like may be stored in a storage medium, for example, the permanent storage device, further includable in the client device 210.

The I/O interface 214 may be a device used for interface with an I/O apparatus 215. For example, an input device may include a device, such as a keyboard, a mouse, a microphone, a camera, etc., and an output device may include a device, such as a display, a speaker, a haptic feedback device, etc. As another example, the I/O interface 214 may be a device for interface with an apparatus in which an input function and an output function are integrated into a single function, such as a touchscreen. The I/O apparatus 215 may be configured as a single device with the client device 210. Also, the I/O interface 224 of the server 220 may be a device for interface with an apparatus for input or output that may be connected to the server 220 or included in the server 220. In detail, when the processor 212 of the client device 210 processes an instruction of a computer program loaded to the memory 211, content or a service screen configured based on data provided from the server 220 or the electronic device 120 may be displayed on the display through the I/O interface 214.

According to other example embodiments, the client device 210 and the server 220 may include the number of components greater than or less than the number of components shown in FIG. 2. For example, the client device 210 may include at least a portion of the I/O apparatus 215, or may further include other components, for example, a transceiver, a global positioning system (GPS) module, a camera, a variety of sensors, a database (DB), and the like. In detail, if the client device 210 is a smartphone, the client device 210 may be configured to further include a variety of components, for example, an acceleration sensor, a gyro sensor, a camera module, various physical buttons, a button using a touch panel, an I/O port, a vibrator for vibration, etc., which are generally included in the smartphone.

Hereinafter, example embodiments of a method and system for providing a communication using a video call bot are described. The video call bot may be also referred to as a chat bot or a video chat bot.

Figure 3:
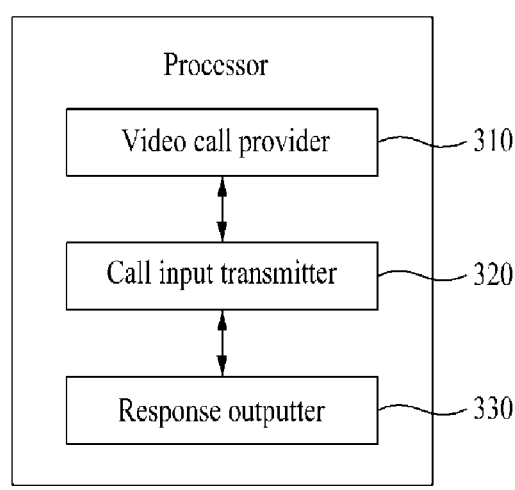
FIG. 3 is a diagram illustrating an example of components includable in a processor of an electronic device according to at least one example embodiment.
Figure 4:
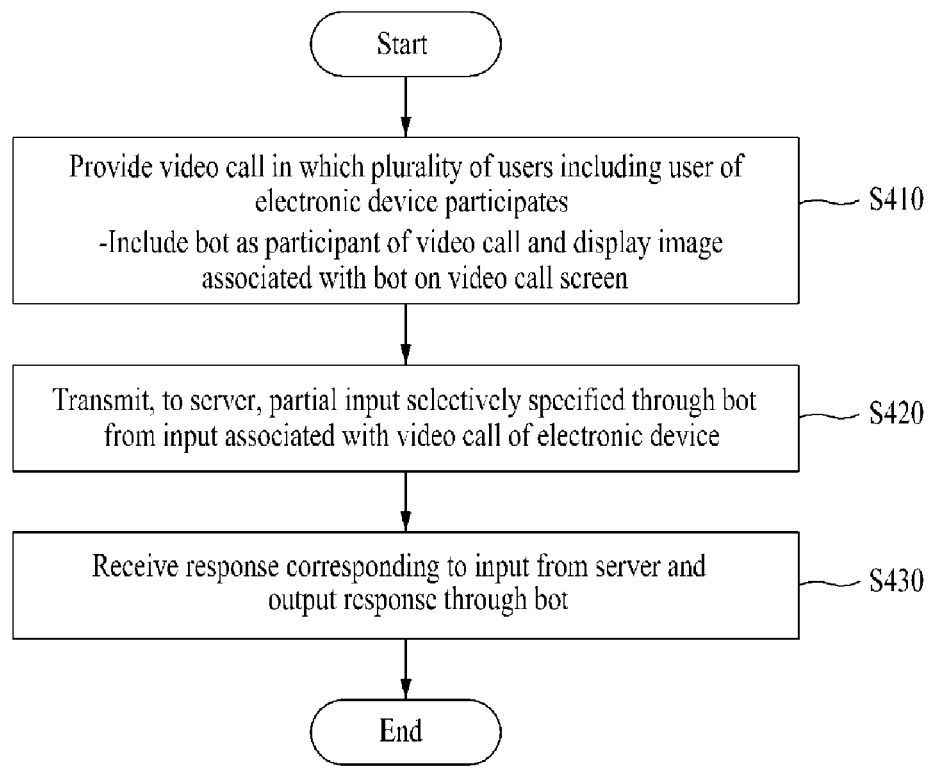
FIG. 4 is a flowchart illustrating an example of a method performed by an electronic device according to at least one example embodiment.

FIG. 3 is a diagram illustrating an example of components includable in a processor of an electronic device according to at least one example embodiment, and FIG. 4 is a flowchart illustrating an example of a method performed by an electronic device according to at least one example embodiment.

A computer-implemented video call system may be configured on the client device 210 according to the example embodiment. For example, the video call system may be configured in a form of a program that independently operates or in an in-app form of a specific application, for example, a messenger, to be operable on the specific application. Depending on cases, the video call system may provide a video call service through interaction with the server 150.

The video call system configured in the client device 210 may perform the video call method of FIG. 4 in response to an instruction provided from the application installed on the client device 210.

Referring to FIG. 3, to perform the video call method of FIG. 4, the processor 212 of the client device 210 may include a video call provider 310, a call input transmitter 320, and a response outputter 330. Depending on example embodiments, the components of the processor 212 may be selectively included in or excluded from the processor 212. Also, depending on example embodiments, the components of the processor 212 may be separated or merged for representations of functions of the processor 212.

The processor 212 and the components of the processor 212 may control the client device 210 to perform operations S410 to S430 included in the video call method of FIG. 4. For example, the processor 212 and the components of the processor 212 may be configured to execute an instruction according to a code of at least one program and a code of an OS included in the memory 211.

Here, the components of the processor 212 may be representations of different functions of the processor 212 performed by the processor 212 in response to an instruction provided from the program code stored in the client device 210, for example, an instruction provided from an application executed on the client device 210. For example, the video call provider 310 may be used as a functional representation of the processor 212 that controls the client device 210 to provide a video call in response to the instruction.

The processor 212 may read instructions from the memory 211 to control the client device 210, for example, to perform operations S410 to S430. The client device 210 may correspond to any one of the electronic devices 110, 120, 130, and 140.

Referring to FIG. 4, in operation S410, the video call provider 310 of the electronic device 110 may provide a group video call in which a plurality of users and a bot participate. The plurality of users may include the users of the electronic devices 110, 120, 130, and 140. In response to receiving, from the electronic device 110, a request for a group video call between the users of the electronic devices 110, 120, 130, and 140, the server 150 may forward a group video call request to the electronic devices 120, 130, and 140 (i.e., counterpart electronic devices) and may establish a video call channel between the electronic device 110 and one or more of the electronic devices 120, 130, and 140 that accept the group video call request. The video call provider 310 may forward, to the server 150, responses of the electronic devices 120, 130, and 140 to participate in the video call and may receive a participant video of the video call from the server 150 as an individual video and may render the received participant video on a single screen, thereby constructing a video call screen. Instead of creating a single video including a plurality of participant videos and then providing the video to the electronic device 110 on the side of the server 150, the server 150 may transmit each participant video to the electronic device 110 as an individual video and the electronic device 110 may construct the plurality of participant videos on a video call screen of a single screen.

The video call provider 310 may include a bot as a participant of the video call. Here, the video call provider 310 may receive an image associated with the bot (hereinafter, a bot video) from the server 150, and may include the bot video and display the bot video on the video call screen as a single participant video. For example, a bot may be selected in a process of selecting a participant of the video call and may participate in the video call from a point in time at which the video call starts. As another example, as if a single participant of the video call invites a friend, the participant may invite a bot and allow the bot to participate in the video call during the video call.

In response to a request from the user of the electronic device 110 for bot invitation, the video call provider 310 may call a bot corresponding to the request and may include the bot as a participant of the video call through interaction with the server 150. Each bot participating in the video call may be predefined through a command line for invitation to the video call or may be determined through personal setting by the user of the electronic device 110. The video call provider 310 may recognize an invitation command line input based on a voice or a text from the user and may allow a different bot to participate in the video call based on the recognized invitation command line. As a scenario similar to a scenario of selecting and inviting a friend from a list of friends in addition to bot invitation using the invitation command line, it is also possible to invite a bot included in the list of friends to the video call.

In operation S420, the call input transmitter 320 may transmit, to the server 150, a partial input selectively specified through the bot from an input (a call video or a call voice) associated with the video call of the electronic device 110. For example, when a call command line for a corresponding bot is recognized by the user of the electronic device 110 in a state in which the bot is participating in the video call, the call input transmitter 320 may transmit, to the server 150, an input during a desired or predetermined period of time from a point in time at which the call command line is recognized. By selectively sharing a partial packet of video call content with the server 150 based on the call command line, the call input transmitter 320 may specify a call voice continuously input after the call command line of the bot or may specify a desired or predetermined number of call video frames during the video call from a point in time at which the call command line is recognized and may transmit the specified call voice or desired or predetermined number of call video frames to the server 150. The input associated with the video call may include the call video and the call voice and also include any types of data inputtable during the video call, such as, for example, a text and an image.

In operation S430, the response outputter 330 may receive a response corresponding to the input specified by the call command line of the bot from the server 150 and may output the received response through the corresponding bot that participates in the video call. The server 150 may share a partial packet of video call content through the bot participating in the video call in which the user of the electronic device 110 is included, and may provide various types of contents, such as a video, a voice, and a text, as a response to the shared packet. For example, the response outputter 330 may output content received as a response corresponding to the input on an area designated for a bot video on the video call screen. As another example, the response outputter 330 may output content received as a response corresponding to the input as a voice of the bot that participates in the video call.

The server 150 may use an input specified by the call command line of the bot during the video call as a query for selecting content in a service corresponding to the corresponding bot. Here, the input forwarded to the server 150 may include a partial video or partial voice transmitted as the video call content. Also, various inputs available as criteria for selecting content, such as, for example, input values through various input interfaces included in the electronic device 110, such as a sensor value sensed around a point in time at which the call command line is recognized, may be additionally included and thereby forwarded to the server 150.

A video call system according to example embodiments may invite a bot as a participant of a video call as if the bot is a single user and may provide, as a response, content corresponding to a call video or a call voice of a specific point time through a bot that participates in the video call.

FIGS. 5 to 12 illustrate examples of describing a process of providing a communication using a video call bot according to at least one example embodiment.

Figure 5:
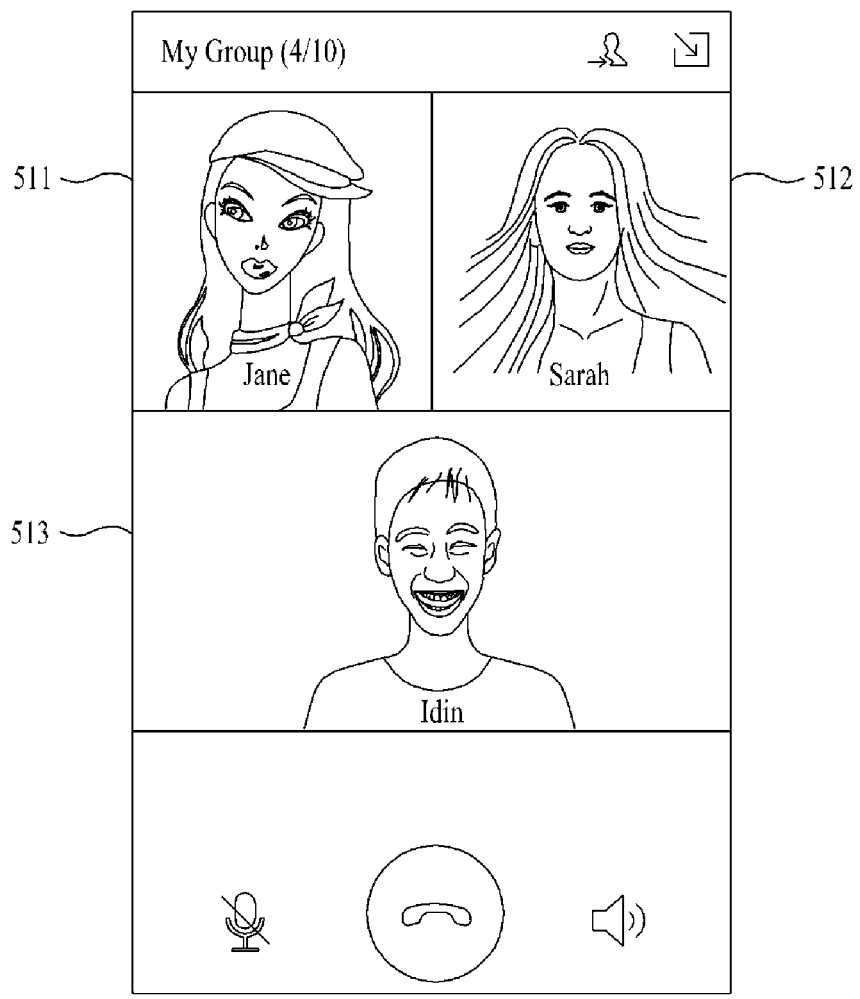

Referring to FIG. 5, the server 150 may provide a video call service by receiving and forwarding videos 511, 512, and 513 among the electronic device 110, 120, and 130 of participants that participate in a video call. If the user of the electronic device 110 participates in the video call, the server 150 may forward, to the electronic device 110, the videos 511, 512, and 513 of participants that participate in the corresponding video call as individual videos. Here, the processor 212 may display a video call screen 500 by rendering, on a single screen, the video 511 input through a camera of the electronic device 110 and the videos 512 and 513 that are input through cameras of the electronic devices 120 and 130 and received as individual videos from the electronic devices 120 and 130, through server 150.

Figure 6:
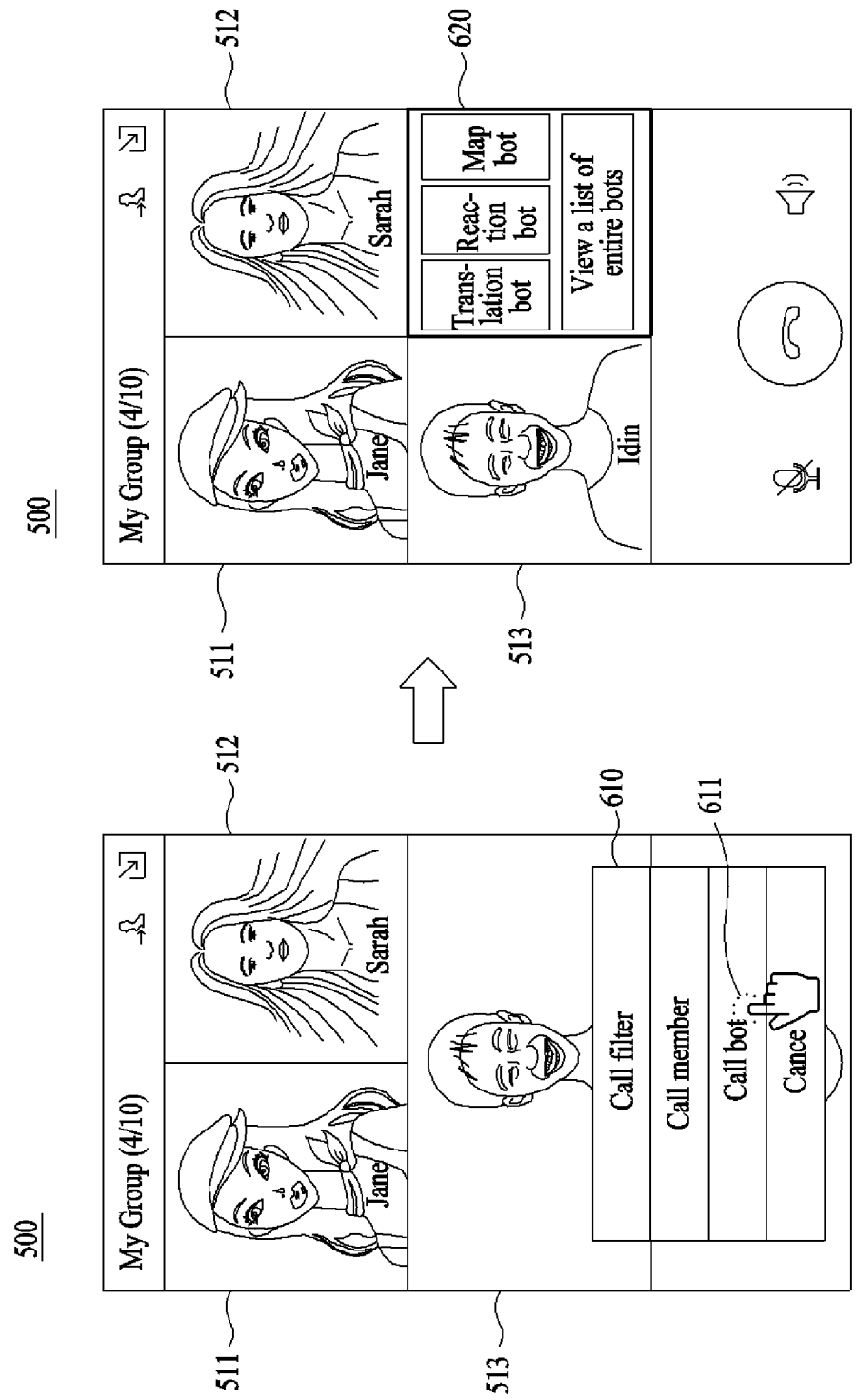

Referring to FIG. 6, in response to a request from the user of the electronic device 110, the processor 212 may provide a menu screen 610 associated with a video call on the video call screen 500. Here, the menu screen 610 may include a "call bot" menu 611 for inviting a bot.

When the user of the electronic device 110 selects the "call bot" menu 611 on the menu screen 610, the processor 212 may provide a bot list screen 620 including at least one bot that may be invited to the video call. For example, the bot list screen 620 may include a list of bots specified by the user of the electronic device 110, for example, a bot recently invited to the video call, a bot preset to favorites, and a bot recommended for a user. The bot list screen 620 may further include a menu for accessing a list of the entire bots capable of being invited to the video call in addition to the above list of bots.

Figure 7:
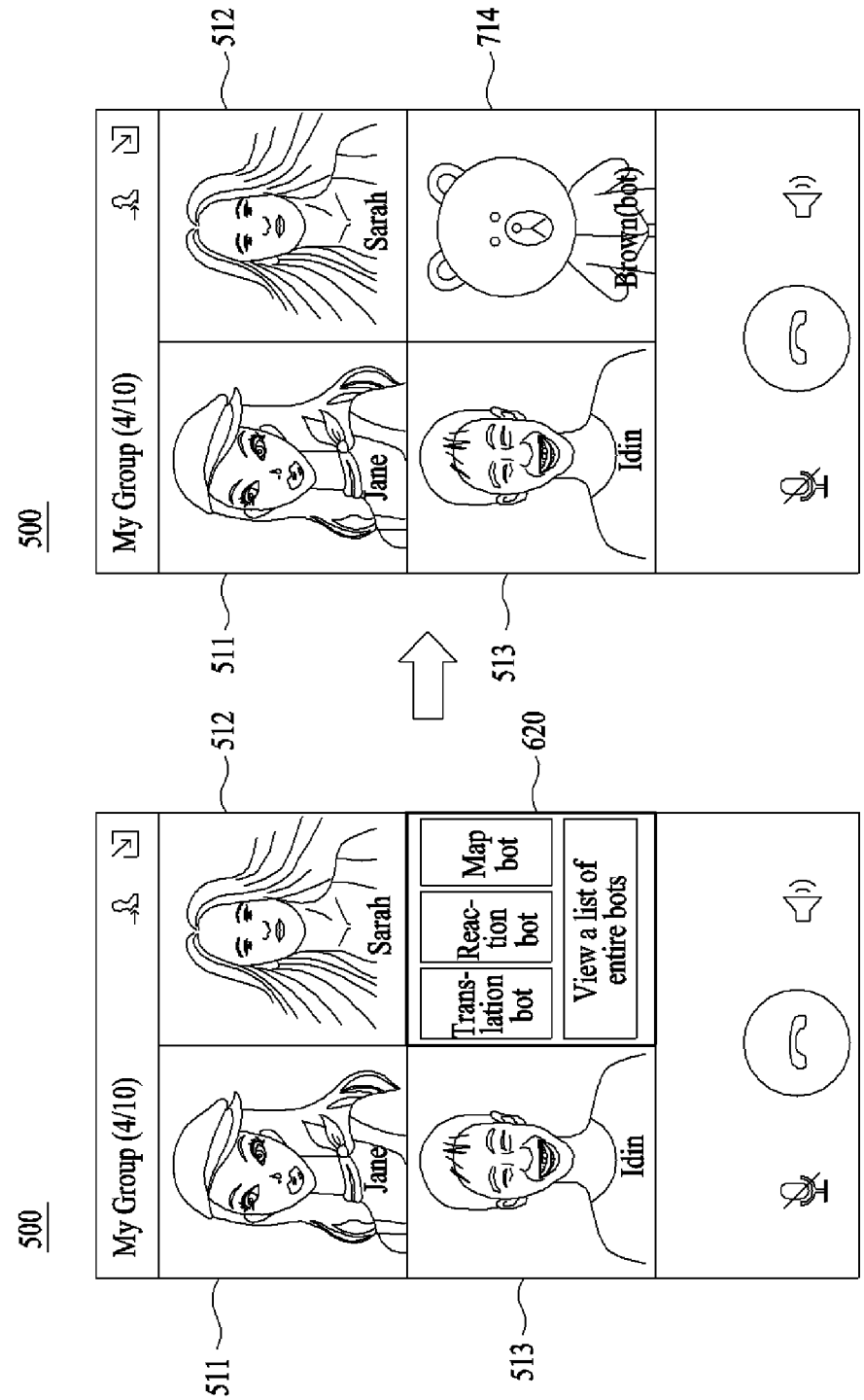

Referring to FIG. 7, the processor 212 may invite, to a video call, a specific bot selected by the user of the electronic device 110 on the bot list screen 620. Here, the processor 212 may receive a bot video 714 as a single participant video from the server 150 and may construct and display the video call screen 500 that includes the bot video 714.

That is, if one of the participants of the video call invites a bot to the video call at a point in time at which the video call starts or during the video call, the processor 212 may receive the bot video 714 as a single participant video and may construct and display the video call screen 500 that includes the bot video 714.

In addition to using a menu related to the video call, the processor 212 may invite a specific bot to the video call using a wake-up word based on a voice or a text as a command line for inviting a bot. Referring to FIG. 8, the processor 212 may store a wake-up word 820 for each bot 810 in a local storage space, for example, the memory 211. Here, the wake-up word 820 may be predefined for each bot 810 or may be directly set by the user of the electronic device 110.

The processor 212 may call a bot of a tool or a different character based on a wake-up word input from the user of the electronic device 110 and may invite the called bot to the video call.

The processor 212 may provide a list of bots capable of participating in the video call through interaction with the server 150 and may provide the wake-up word 820 for each bot 810 with respect to a bot requested to add to a list of friends by the user of the electronic device 110 in the list of bots.

If the wake-up word 820 is recognized as a voice input or a text input by the user of the electronic device 110, the processor 212 may call the bot 810 corresponding to the input wake-up word 820 and may include the called bot 810 as a participant of the video call.

The wake-up word 820 may be used as an invitation command line for bot invitation before a bot is invited to the video call and may be used as a call command line for requesting a response of the bot after the bot is invited to the video call. The invitation command line and the call command line may be differently set.

The processor 212 may invite a bot included in the list of friends to the video call using the list of friends, in addition to invitation using the wake-up word 820.

Figure 9:
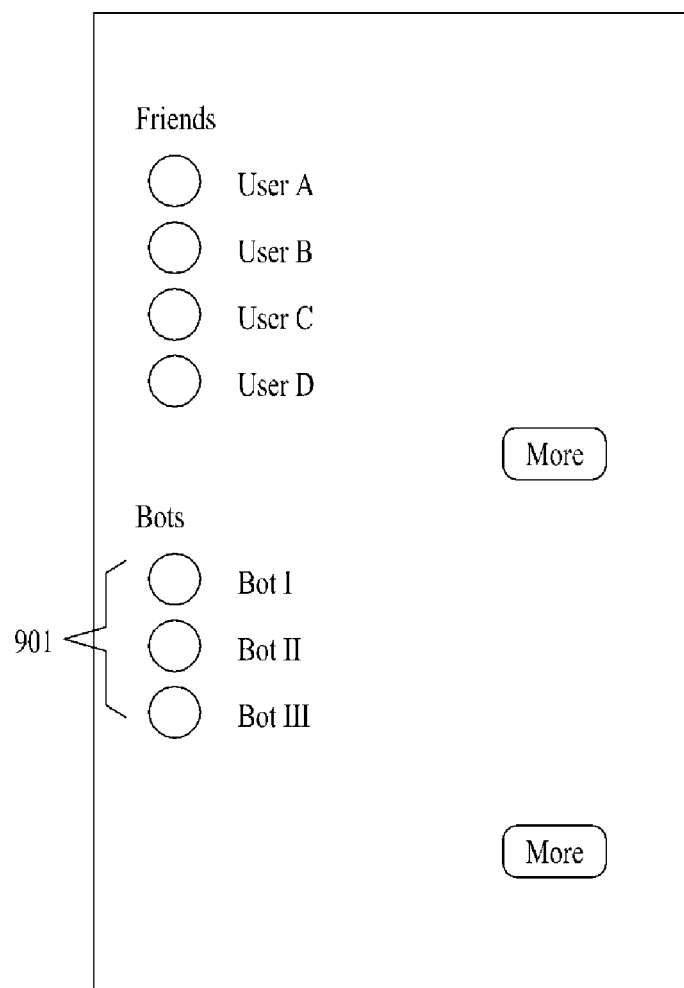

Referring to FIG. 9, in response to a request from the user of the electronic device 110, the processor 212 may provide an interface screen 900 that includes a list of friends as one of a plurality of interfaces associated with a video call and may provide a list of bots 901 capable of participating in a video call through the interface screen 900. Here, the list of bots 901 may include a bot added as a friend by the user or a bot recommend by the server 150.

A video call bot may be implemented as a character of celebrity, such as a popular entertainer, or a tool role of a specific function. The video call bot may be obtained through an in-app purchase on a platform that interacts with the server 150 and may add a bot purchased by the user of the electronic device 110 to a list of friends of the user. Also, in response to a request from the user of the electronic device 110, the server 150 may create and provide a bot of a tool or a personalized character desired by the user. The server 150 may recommend at least one bot based on a video call participant, user profile information, and user content consumption history.

Figure 10:
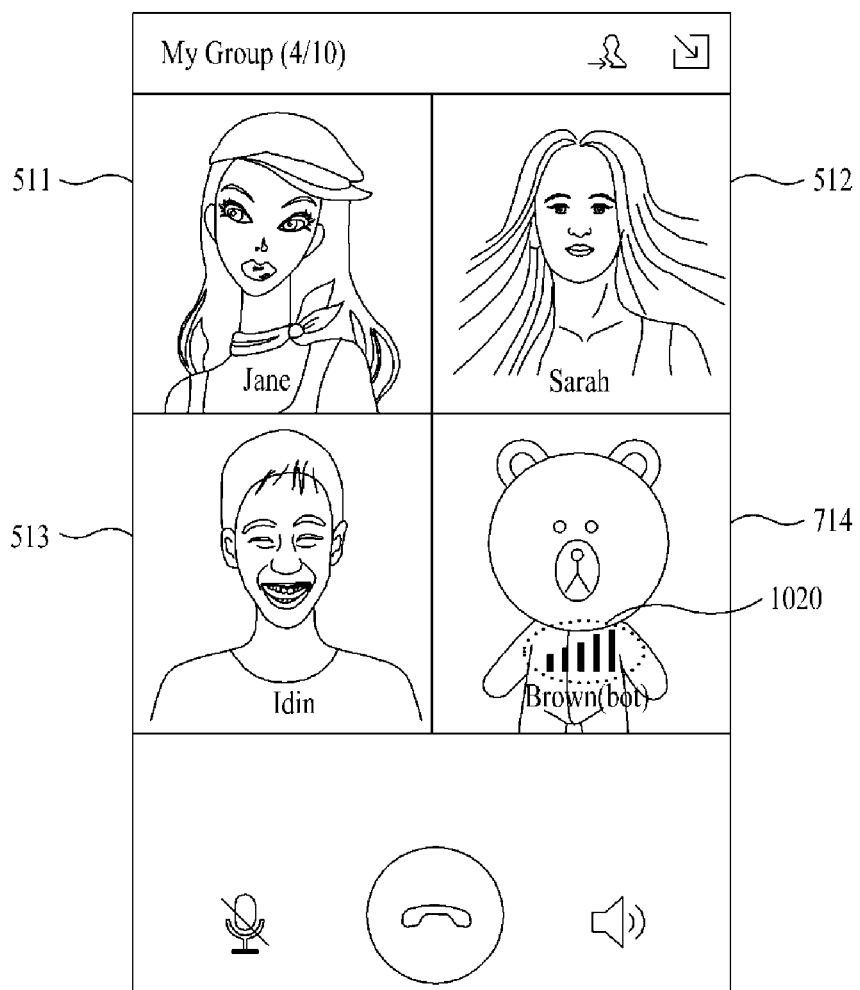

The processor 212 may output a reaction of a character in a bot video based on a response received from the server 150 to a shared packet of video call content. That is, the video call bot may provide a reaction based on a voice or a video for the video call content. For example, if the user of the electronic device 110 utters such as "Today is Sarah's birthday" with a call command line "brown" during a video call, the processor 212 may transmit, to the server 150, a call voice packet "Today is Sarah's birthday" uttered immediately after (or within a predetermined time after) the call command line "brown" is recognized. Referring to FIG. 10, based on a response received from the server 150 to the call voice packet "Today is Sarah's birthday" immediately after the call command line "brown" is recognized during the video call (e.g., when the voice "Today is Sarah's birthday" is input within a predetermined time (e.g., 2 seconds) after the call command line "brown" is recognized), the processor 212 may output a happy birthday voice as a reaction of a character in the bot video 714. Here, the processor 212 may additionally display a user interface 1020 representing that voice is being output while outputting the happy birthday voice in the bot video 714. The processor 212 may provide a video-based reaction, such as modifying an appearance of a character, for example, allowing a character in the bot video 714 to wear a different costume or a conical hat or applying a birthday-related filter on the bot video 714 based on a response received from the server 150 to the call voice packet "Today is Sarah's birthday" immediately after the call command line "brown" is recognized during the video call.

Figure 11:
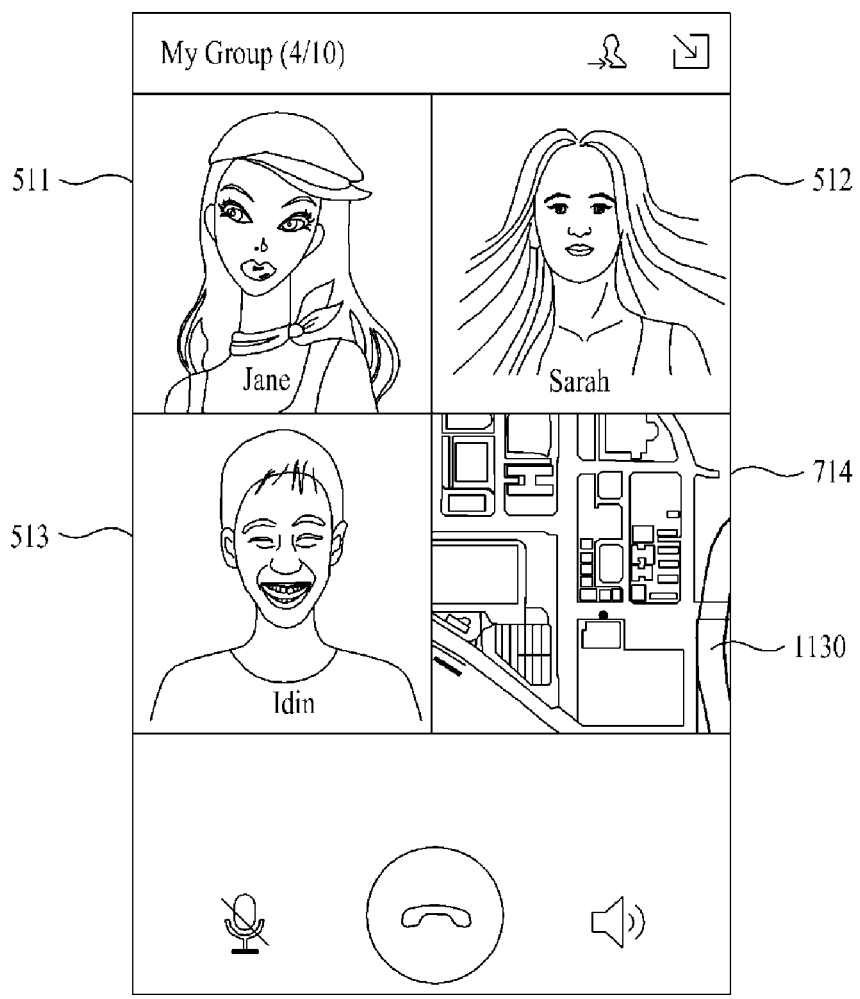

The processor 212 may output map information through a bot video based on a response received from the server 150 to a shared packet of video call content. That is, the video call bot may function as a tool that provides a location-based service, for example, a map service, in a video call environment. For example, if the user of the electronic device 110 utters "Where is the nearest café near me?" with the call command line "brown" during a video call, the processor 212 may transmit, to the server 150, a call voice packet "Where is the nearest café near me?" uttered immediately after (or within a predetermined time after) the call command line "brown" is recognized through a bot that operates as a map tool. Referring to FIG. 11, based on a response received from the server 150 to the call voice packet "Where is the nearest café near me?" immediately after (or within a predetermined time after) the call command line "brown" is recognized during the video call, the processor 212 may output a map screen 1130 on an area designated for the bot video 714 during a desired or predetermined period of time.

The processor 212 may output a translation result through a bot video based on a response received from the server 150 to a shared packet of video call content. That is, the video call bot may function as a tool that provides a translation service in a video call environment. For example, referring to FIG. 12, if the user of the electronic device 110 captures a picture of a translation target with a camera of the electronic device 110 while uttering the call command line "brown" and "Please translate this picture" during a video call, the processor 212 may transmit, to the server 150, a call video packet immediately after (or within a predetermined time after) the call command line "brown" is recognized, that is, an original text image 1201 including non-English characters, captured on an area corresponding to the video 511 of the user of the electronic device 110 through a bot that operates as a translation tool. When the command "please translate this picture" is recognized within a predetermined time (e.g., 5 seconds) before or after the original text image 1201 is received from the user of the electronic device 110, the translation operation of the bot may be initiated. Based on a response received from the server 150 to the call video packet immediately after (or within a predetermined time after) the call command line "brown" is recognized during the video call, the processor 212 may output an image 1240 that includes a translation result of the non-English text in the original text image 1201 on an area occupied by the bot video 714 during a desired or predetermined period of time.

Likewise, with the assumption that a video call bot operates as a shopping tool, if the user captures a product image with the camera of the electronic device 110 while uttering the call command line "brown" and "I want to buy it" during a video call, the processor 212 may transmit, to the server 150, a call video packet transmitted from the electronic device 110 immediately after the call command line "brown" is recognized, that is, the product image captured on an area corresponding to the video 511 of the user of the electronic device 110. Based on a response received from the server 150 to the call video packet immediately after the call command line "brown" is recognized, the processor 212 may output site information at which the user may purchase a product on an area occupied by the bot video 714 during a desired period of time.

Although the example embodiment describes that content provided through the video call bot is output on the area designated for the bot video 714 on the video call screen 500, it is provided as an example only. Depending on example embodiments, the content provided through the video call bot may be temporarily displayed on the entire area of the video call screen 500. For example, the processor 212 may selectively display the content provided through the video call bot on the entire area of the video call screen 500 or the area designated for the bot video 714 based on a type of the video call bot or a type of the content provided through the video call bot. As another example, the processor 212 may display the content provided through the video call bot to be overlaid on a partial area of the video call screen 500 in a popup form regardless of the bot video 714.

The content providable through the bot during a video call may include a reaction, map information, translation information, and shopping information with respect to call content. The content is provided as an example only and may include any types of Internet information capable of responding based on a voice packet or a video packet transmitted during the video call, such as, for example, an image search, a moving picture search, a news search, dictionary information, movie information, music information, book information, palmistry or contemplation, and couple matching.

According to another example embodiment, at least a portion of content provided through a bot during a video call may be transmitted as a message of a chatroom associated with the corresponding video call. The content provided through the bot during the video call may be transmitted as the message by the bot in response to a user selection or a preset value.

According to some example embodiments, it is possible to respond with a variety of information through a bot in a video call environment by inviting the bot as a participant of a video call as if the bot is a single user and to support a communication of an infinite function.

The systems or the apparatuses described herein may be implemented using hardware components, software components, and/or a combination thereof. For example, a processing device may be implemented using one or more general-purpose or special purpose computers, such as, for example, a processor, a controller and an arithmetic logic unit (ALU), a digital signal processor, a microcomputer, a field programmable gate array (FPGA), a programmable logic unit (PLU), a microprocessor, or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciate that a processing device may include multiple processing elements and multiple types of processing elements. For example, a processing device may include multiple processors or a processor and a controller. In addition, different processing configurations are possible, such as parallel processors.

The software may include a computer program, a piece of code, an instruction, or some combinations thereof, for independently or collectively instructing or configuring the processing device to operate as desired. Software and/or data may be embodied permanently or temporarily in any type of machine, component, physical equipment, computer record medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable record mediums.

The methods according to the above-described example embodiments may be configured in a form of program instructions performed through various computer devices and recorded in non-transitory computer-readable media. The media may also include, alone or in combination with the program instructions, data files, data structures, and the like. The media may continuously store computer-executable programs or may temporarily store the same for execution or download. Also, the media may be various types of recording devices or storage devices in a form in which one or a plurality of hardware components are combined. Without being limited to media directly connected to a computer system, the media may be distributed over the network. Examples of the media include magnetic media such as hard disks, floppy disks, and magnetic tapes; optical media such as CD-ROM and DVDs; magneto-optical media such as floptical disks; and hardware devices that are specially configured to store and perform program instructions, such as ROM, RAM, flash memory, and the like. Examples of other media may include recording media and storage media managed by an app store that distributes applications or a site, a server, and the like that supplies and distributes other various types of software.

The foregoing embodiments are merely examples and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A video call method implemented by a computer apparatus, the video call method comprising:
   receiving a wake-up word among a plurality of wake-up words during a video call, wherein each of the plurality of wake-up words is set for a respective type of a chat bot among a plurality of different types of chat bots and the chat bot is related to a character of celebrity or a tool role of a specific function;
   in response to receiving the wake-up word, displaying a profile image corresponding to the chat bot that corresponds to the wake-up word as a participant of the video call, wherein the profile image is different from another profile image corresponding to another chat bot;
   transmitting, to a server, a command line that is associated with the chat bot and is extracted from a voice input that is input to the computer apparatus during the video call; and
   in response to the command line, outputting a response to the command line through the chat bot that participates in the video call.

2. The video call method of claim 1, wherein the displaying comprises:
   receiving a first video associated with the chat bot from the server;
   rendering a second video of at least one user among a plurality of users participating in the video call and the first video associated with the chat bot; and
   simultaneously displaying the first video and the second video on a display screen of the computer apparatus.

3. The video call method of claim 1, wherein the displaying comprises:
   recognizing the wake-up word that is input to the computer apparatus during the video call as a bot invitation command; and
   displaying the chat bot as a participant of the video call in response to the bot invitation command.

4. The video call method of claim 1, wherein the wake-up word is used as a bot invitation command for inviting the chat bot before the chat bot participates in the video call, and
   wherein the wake-up word is used as a response request command for requesting the chat bot to provide the response after the chat bot participates in the video call.

5. The video call method of claim 1, wherein the transmitting comprises:
   recognizing the command line for the chat bot that is input to the computer apparatus; and
   transmitting, to the server, a voice or a video that is input to the computer apparatus after the command line is recognized.

6. The video call method of claim 5, wherein the transmitting of the voice or the video comprises:
   transmitting, to the server, the voice or the video that is input within a predetermined period of time since the command line is recognized.

7. The video call method of claim 1, wherein the outputting comprises:
   outputting, as a voice or a video, the response retrieved by the server to the command line through the chat bot that participates in the video call.

8. The video call method of claim 1, wherein the outputting comprises:
   displaying the response to the command line in an area designated for the chat bot on a display screen of the computer apparatus.

9. The video call method of claim 1, wherein the outputting comprises:
   outputting the response to the command line as a voice corresponding to the chat bot that participates in the video call.

10. A non-transitory computer-readable record medium storing instructions that, when executed by a processor of the computer apparatus, cause the processor to perform the video call method of claim 1.

11. A computer apparatus comprising:
    at least one memory configured to store computer-readable instructions; and
    at least one processor configured to execute the computer-readable instructions to:
    receive a wake-up word among a plurality of wake-up words during a video call, wherein each of the plurality of wake-up words is set for a respective type of a chat bot among a plurality of different types of chat bots and the chat bot is related to a character of celebrity or a tool role of a specific function;
    display, in response to receiving the wake-up word, a profile image corresponding to the chat bot that corresponds to the wake-up word as a participant of the video call, wherein the profile image is different from another profile image corresponding to another chat bot;
    transmit, to a server, a command line that is associated with the chat bot and is extracted from a voice input that is input to the computer apparatus during the video call; and
    in response to the command line, output a response to the command line through the chat bot that participates in the video call.

12. The computer apparatus of claim 11, wherein the at least one processor is further configured to execute the computer-readable instructions to:
    receive a first video associated with the chat bot from the server;
    render a second video of at least one user among a plurality of users participating in the video call and the first video associated with the chat bot; and
    simultaneously display the first video and the second video on a display screen of the computer apparatus.

13. The computer apparatus of claim 11, wherein the at least one processor is further configured to execute the computer-readable instructions to:
    recognize the wake-up word that is input to the computer apparatus during the video call as a bot invitation command; and
    display the chat bot as a participant of the video call in response to the bot invitation command.

14. The computer apparatus of claim 11, wherein the wake-up word is used as an invitation command for inviting the chat bot before the chat bot participates in the video call, and
    wherein the wake-up word is used as a response request command for requesting the chat bot to provide the response after the chat bot participates in the video call.

15. The computer apparatus of claim 11, wherein the at least one processor is further configured to execute the computer-readable instructions to:
  recognize the command line for the chat bot that is input to the computer apparatus; and
  transmit, to the server, a voice or a video that is input to the computer apparatus after the command line is recognized.

16. The computer apparatus of claim 15, wherein the at least one processor is further configured to execute the computer-readable instructions to:
  transmit, to the server, the voice or the video that is input within a predetermined time since the command line is recognized.

17. The computer apparatus of claim 11, wherein the at least one processor is further configured to execute the computer-readable instructions to:
  display the response to the command line on an area designated the chat bot on a display screen of the computer apparatus.

18. A computer apparatus comprising:
  at least one memory configured to store computer-readable instructions; and
  at least one processor configured to execute the computer-readable instructions to:
    connect the computer apparatus to a video call;
    receive a wake-up word among a plurality of wake-up words during the video call, wherein each of the plurality of wake-up words is set for a respective type of a chat bot among a plurality of different types of chat bots and the chat bot is related to a character of celebrity or a tool role of a specific function;
    in response to recognizing the wake-up word as a bot invitation command, inviting the chat bot to the video call and displaying a profile image corresponding to the chat bot as a participant of the video call on a video call screen of the computer apparatus, together with images provided from participants of the video call, wherein the profile image is different from another profile image corresponding to another chat bot; and
    in response to recognizing, from a voice that is input from at least one of the participants of the video call, a response request command that requests the chat bot to provide a response, replace a chat bot image of the chat bot with the response provided from the chat bot, during the video call.

19. The computer apparatus of claim 18, wherein the participants of the video call comprise a first participant, and
  wherein the at least one processor is further configured to execute the computer-readable instructions to:
    when the response request command comprises a translation request that is received from an electronic device of the first participant, translate an original text image that is input from the electronic device of the first participant, through the chat bot, and replace the chat bot image with a result of translating the original text image.

20. The computer apparatus of claim 18, wherein the at least one processor is further configured to execute the computer-readable instructions to:
  when the response request command comprises a location information request, obtain a map including requested location information, through the chat bot, and replace the chat bot image with the map.

* * * * *